United States Patent [19]

Lawson

[11] Patent Number: 5,178,472
[45] Date of Patent: Jan. 12, 1993

[54] BEARING FOR MOUNTING ON A MULTI-SIDED SHAFT

[75] Inventor: James L. Lawson, Spartanburg, S.C.

[73] Assignee: The Torrington Company, Torrington, Conn.

[21] Appl. No.: 805,170

[22] Filed: Dec. 11, 1991

[51] Int. Cl.⁵ .............................................. F16C 33/58
[52] U.S. Cl. ................................. 384/537; 384/460; 384/543; 384/585
[58] Field of Search ............... 384/537, 460, 543, 585, 384/586, 569

[56] References Cited

U.S. PATENT DOCUMENTS

| | | | |
|---|---|---|---|
| 2,566,991 | 9/1951 | McKay | 384/460 |
| 2,597,524 | 5/1952 | Birt | 384/460 |
| 3,369,849 | 2/1968 | Hatcher | 384/460 |
| 4,792,244 | 12/1988 | Yamashita et al. | 384/585 |

Primary Examiner—Lenard A. Footland
Attorney, Agent, or Firm—John C. Bigler

[57] ABSTRACT

A bearing has an inner ring coaxial to and rotatable relative to an outer ring. A central bore of the inner ring accommodates a multi-sided shaft in at least two positions that are angularly offset relative to each other. Each position provides a different fit between the inner ring and the shaft. A preferred embodiment has a 12-pointed star-shaped bore defined by the superposition of two hexagons of slightly different scale, to accommodate a hexagonal shaft in either of two positions. The second position provides a tighter fit between the bearing and the shaft without requiring tighter manufacturing tolerances.

12 Claims, 2 Drawing Sheets

BEARING FOR MOUNTING ON A MULTI-SIDED SHAFT

BACKGROUND OF THE INVENTION

This invention relates generally to shaft-mounted bearings and, more particularly, to hexagonal and square bore bearings for mounting on hexagonal and square shafts, respectively.

Hexagonal bore and square bore bearings are commonly used in agricultural machinery, such as for example disc harrows. The hexagonal or square bore within the inner ring of such bearings is positioned over a mid-portion of a complementary hexagonal or square shaft to prevent motion of the inner ring relative to the shaft. Such bearings are also used in applications outside the field of agricultural machinery to mount a rotating hexagonal or square shaft.

Typically, bearings of this type that are manufactured for use in agricultural machinery have a dimensional tolerance of approximately 0.005 inch at the hexagonal or square bore. Variations in the dimensions can be attributed to distortions caused by broaching the bores in the soft state before hardening or to heat treat growth after broaching. Also, broach tool tolerances, tool wear, and gaging errors may add to tolerance build up.

Current practice is to have full interchangeability of shafts and bearings; that is, all bearings are made with a bore larger than the maximum size of the shaft to be fitted. The shafting is generally cold drawn and has an associated dimensional tolerance of approximately 0.004 inch. Thus, if a particular shaft is 0.004 inch under nominal size and a bearing bore is 0.005 inch over nominal size, the resulting maximum clearance would be 0.009 inch. The average clearance would be 0.0045 inch.

This manufacturing clearance may adversely affect bearing life, noise, shaft fretting, and maximum rotational speed of the bearing. Additional clearance may result from wear of the shaft or the bore of the bearing during use, increasing the adverse affects.

To manufacture the bore or the shaft to tighter dimensional tolerances by grinding rather than standard machining technique would result in substantial increased cost. Other means for preventing motion of the inner ring relative to the shaft, such as an eccentric collar, cam lock, or set screw on a collar, also result in increased cost and require additional axial length. In addition, such alternative retention devices may loosen during use and allow the inner ring to rotate with the shaft.

The foregoing illustrates limitations known to exist in present bearings for mounting on multi-sided shafts. Thus, it is apparent that it would be advantageous to provide an alternative directed to overcoming one of more of the limitations set forth above. Accordingly, a suitable alternative is provided including features more fully disclosed hereinafter.

SUMMARY OF THE INVENTION

In one aspect of the present invention, this is accomplished by providing a bearing for mounting on a multi-sided shaft comprising an outer ring and an inner ring coaxial with and rotatable relative to the outer ring. The inner ring is formed with a central bore which accommodates the multi-sided shaft in at least two positions with different fit between the inner ring and the multi-sided shaft, the positions being angularly offset relative to each other.

The foregoing and other aspects will become apparent from the following detailed description of the invention when considered in conjunction with the accompanying drawing figures.

BRIEF DESCRIPTION OF THE DRAWING FIGURES

FIG. 1 is an end view of a hexagonal bore bearing of the prior art;

FIG. 2. is an end view, partially in section, of a first embodiment of the present invention;

FIG. 3 is a side view, in section, of the embodiment of FIG. 2 and indicating at 2—2 the sectioning of FIG. 2; and FIG. 4 is an end view, partially in section, of a second embodiment of the present invention.

In this specification, similar elements in different embodiments are given like reference characters.

DETAILED DESCRIPTION

Figure 1:
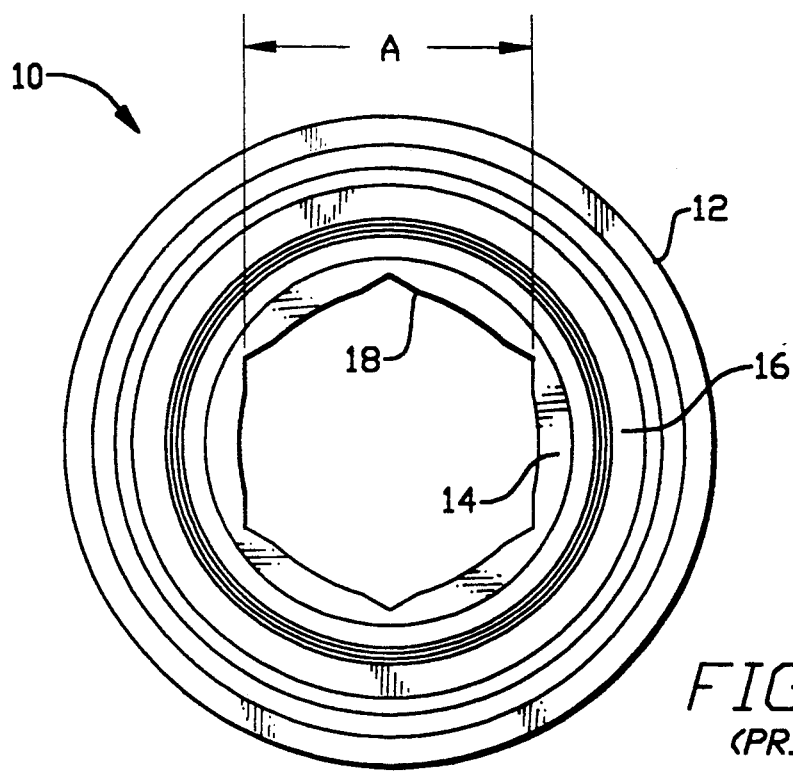

Referring now to the drawings, FIG. 1 illustrates a bearing 10 of a type currently used in agricultural machinery to mount a rotating hexagonal shaft. The bearing 10 includes an outer ring 12, an inner ring 14, and a seal 16 covering rolling elements, not shown. The inner ring 14 has a central bore 18 for receiving the hexagonal shaft such that relative rotation between the inner ring 14 and the hexagonal shaft is prevented.

The central bore 18 of the prior art bearing 10 is substantially hexagonal in end view to mate with the hexagonal shaft. The distance between opposite flat surfaces of the central bore 18 is indicated as dimension A in FIG. 1. As discussed in the Background of the Invention, dimension A is typically manufactured with a tolerance of 0.005 inch and is sized to fit over the hexagonal shaft with a clearance fit.

Figure 2:
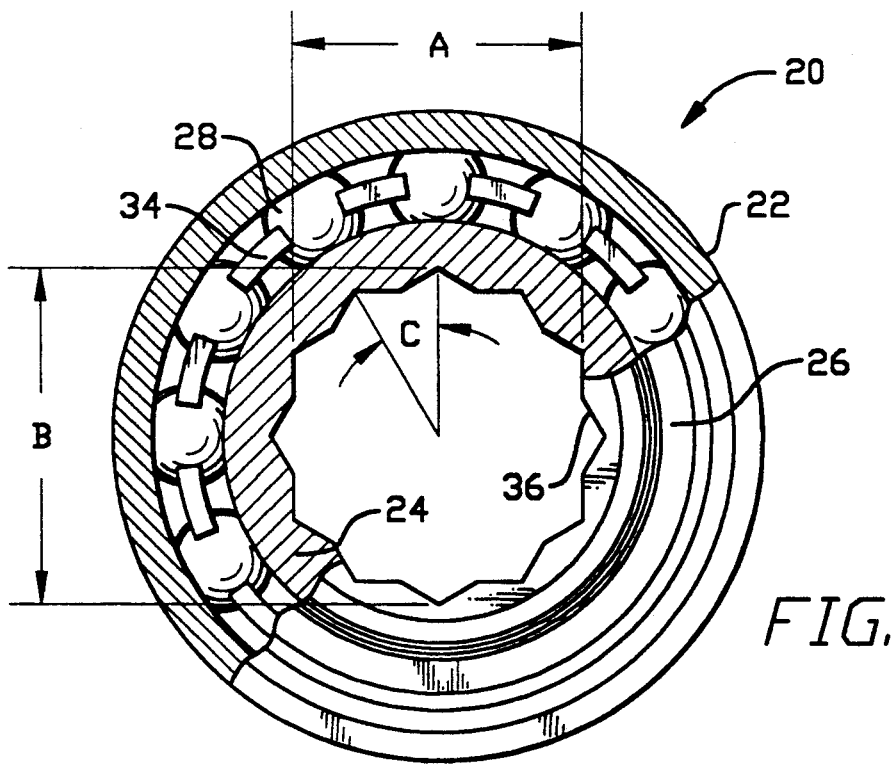
Figure 3:
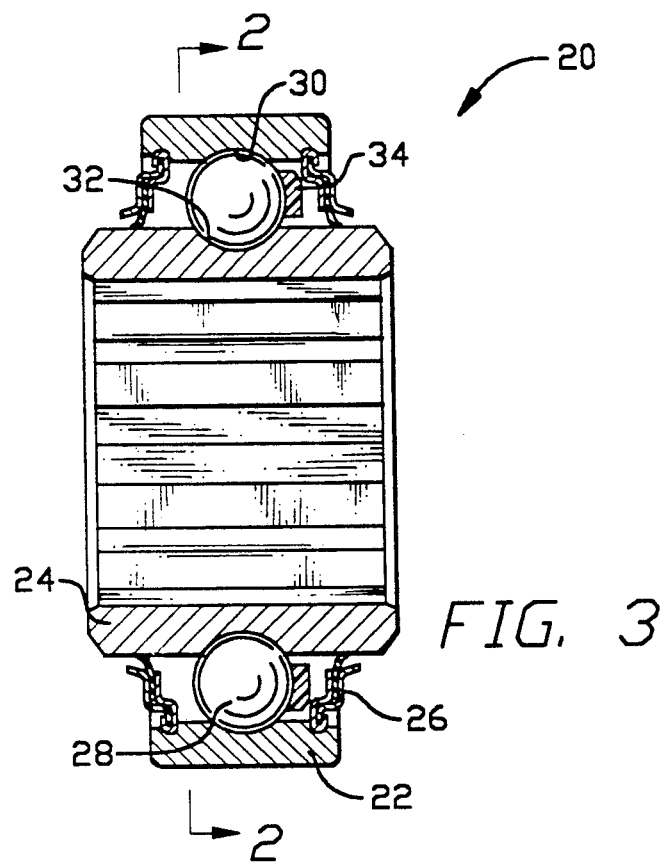

A first preferred embodiment of the present invention is indicated as bearing 20 in FIGS. 2 through 3. The bearing 20 includes an outer ring 22, an inner ring 24, and a seal 26 covering rolling elements 28. An outer raceway 30 and an inner raceway 32 are provided within the outer and inner rings 22 and 24, respectively. The rolling elements 28 may be a full complement or may be separated by a cage or retainer 34.

The inner ring 24 has a central bore 36 having a 12-pointed star-shaped configuration defined by the superposition of two hexagons of slightly different scale, the two hexagons being offset relative to each other by an angle C, as indicated in FIG. 2. The distance between opposite flat surfaces of the first hexagon is indicated as dimension A and is similar to that of FIG. 1. The distance between opposite flat surfaces of the second hexagon is indicated as dimension B and is slightly smaller than dimension A.

The 12-pointed star-shaped configuration of the central bore 36 provides two positions for mounting the bearing 20 on the hexagonal shaft. If the fit at the position with dimension A is loose due to the manufacturing tolerance of the central bore 36 o the hexagonal shaft, a tighter fit can be obtained by mounting the bearing 20 at the position with dimension B. The difference between dimension A and dimension B is selected to correspond with the range of anticipated dimensional tolerances.

If manufacturing tolerances of the central bore 36 and the hexagonal shaft are comparable to those described for the prior art of FIG. 1, the average clearance can be reduced from 0.0045 inch to 0.002 inch, according to preliminary studies. Similarly, those studies indicate that the maximum clearance can be reduced from 0.009 inch to 0.005 inch.

However, the manufacturing tolerance of the central bore 36 is improved by the new configuration, thus making an even closer average fit possible. Less heat treat distortion occurs because the cross-section of the inner ring 24 is more uniform compared to the inner ring 14 of the prior art. In addition, the geometry of the inner ring 24 can be modified to provide greater strength and to provide for possible forging of the inner ring 24

Figure 4:
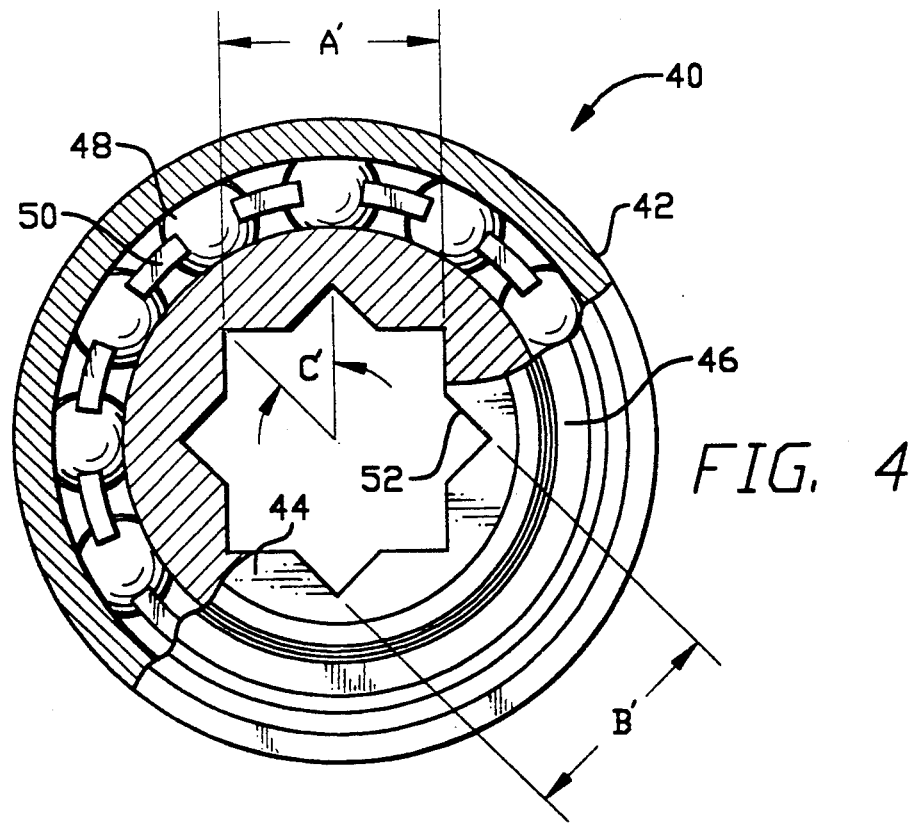

A second preferred embodiment of the present invention is indicated as bearing 40 in FIG. 4. The bearing 40 includes an outer ring 42, and inner ring 44, a seal 46, rolling elements 48, and cage or retainer 50. The inner ring 44 has a central bore 52 having an 8-pointed star-shaped configuration defined by the superposition of two squares of slightly different scale, the two squares being offset relative to each other by an angle C'.

The distance between opposite flat surfaces of the first square is indicated as dimension A' and the slightly greater distance between opposite flat surfaces of the second square is indicated as dimension B'. The 8-pointed star-shaped configuration of the central bore 52 provides two positions for mounting the bearing 40 on a square shaft. If the fit at the position with dimension A' is loose, a tighter fit can be obtained by mounting the bearing 40 at the position with dimension B.

Although only bearings for mounting on hexagonal and square shafts are specifically illustrated in the drawings, it will be apparent that the present invention is applicable to bearings for mounting on other multi-sided shafts including, for example, keyed shafts and shafts with a D-shaped cross-section. Also, the number of alternative positions may be three or more, and the angle of offset may be different from the 30 degrees and 45 degrees illustrated as C and C' in FIGS. 2 and 4, respectively. In addition, the invention is applicable to sliding bearings as well as bearings with rolling elements.

Each of the described variations of the present invention results in a closer fit between a multi-sided shaft and the bearing with no change in manufacturing dimensional tolerances. Bearing life and load capacity is improved; noise and fretting of the shaft is reduced. The invention allows a stronger design, reduces heat treat distortion, and results in lower manufacturing cost. Such bearings can operate at higher speeds and with reduced wear of the bearing bore and the shaft.

Other uses of the bearing of the present invention are also apparent. The dimensions corresponding to dimensions A and B of the drawings may be selected to allow use of undersize shafting. Similarly, the dimensions may be selected to compensate for wear after initial installation and extend the useful life of the bearing. Thus, the position with dimension B may be designed with an interference fit that does not permit installation initially, the position being provided for use only after the shaft is worn down sufficiently to provide a clearance fit.

Having described the invention, what is claimed is:

1. A bearing for mounting on a multi-sided shaft, the bearing comprising:
   an outer ring; and
   an inner ring coaxial with and rotatable relative to the outer ring, the inner ring formed with a central bore which accommodates the multi-sided shaft in at least two positions with different fit between the inner ring and the multi-sided shaft, the positions being angularly offset relative to each other.

2. A bearing in accordance with claim 1, wherein the central bore of the inner ring has a star-shaped configuration defined by the superposition of at least two figures approximating the cross-section of the multi-sided shaft, said figures being of slightly different scale.

3. A bearing in accordance with claim 2, wherein a first of said figures is scaled to provide a clearance fit between the inner ring and the multi-sided shaft throughout a range of dimensional tolerance, and wherein a second of said figures is smaller than said first figure and is scaled to provide a tighter fit between the inner ring and the multi-sided shaft.

4. A bearing in accordance with claim 1, wherein the multisided shaft is hexagonal in cross-section and said positions are off-set by an angle of thirty degrees.

5. A bearing in accordance with claim 4, wherein the central bore of the inner ring has star-shaped configuration defined by the superposition of at least two hexagons of slightly different scale.

6. A bearing in accordance with claim 5, wherein the central bore of the inner ring has a star-shaped configuration defined by the superposition of at least two squares of slightly different scale.

7. A bearing in accordance with claim 1, wherein the multi-sided shaft is square in cross-section and said positions are offset by an angle of forty-five degrees.

8. A bearing in accordance with claim 1 further comprising a plurality of roller elements between the outer ring and the inner ring.

9. A bearing for mounting on a hexagonal shaft, the bearing comprising:
   an outer ring; and
   an inner ring coaxial with and rotatable relative to the outer ring, the inner ring formed with a central bore which accommodates the hexagonal shaft in at least two positions with a different fit between the inner ring and the hexagonal shaft, the positions being angularly offset relative to each other.

10. A bearing in accordance with claim 9, wherein the central bore of the inner ring has a 12-pointed star-shaped configuration defined by the superposition of two hexagons of slightly different scale, the two hexagons being offset thirty degrees relative to each other.

11. A bearing in accordance with claim 10, wherein one of said two hexagons is scaled to provide a clearance fit between the inner ring and the hexagonal shaft throughout a range of dimensional tolerance, and wherein the second of said two hexagons is scaled to provide a tighter fit between the inner ring and the hexagonal shaft.

12. A bearing in accordance with claim 9 further comprising a plurality of roller elements between the outer ring and the inner ring.

* * * * *